(12) United States Patent
Liang

(10) Patent No.: US 11,714,261 B2
(45) Date of Patent: Aug. 1, 2023

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventor: Yuan-Fan Liang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 469 days.

(21) Appl. No.: 16/845,162

(22) Filed: Apr. 10, 2020

(65) Prior Publication Data
US 2020/0326515 A1 Oct. 15, 2020

(30) Foreign Application Priority Data
Apr. 12, 2019 (CN) .......................... 201910293468.7

(51) Int. Cl.
*G02B 9/60* (2006.01)
*G02B 13/06* (2006.01)
*G02B 13/18* (2006.01)
*G02B 9/62* (2006.01)

(52) U.S. Cl.
CPC ................. *G02B 9/60* (2013.01); *G02B 9/62* (2013.01); *G02B 13/06* (2013.01); *G02B 13/18* (2013.01)

(58) Field of Classification Search
None
See application file for complete search history.

(56) References Cited

U.S. PATENT DOCUMENTS

| 7,580,205 | B2* | 8/2009 | Asami ................. G02B 13/06 359/770 |
| 9,632,283 | B2 | 4/2017 | Hsu et al. |
| 10,551,593 | B2 | 2/2020 | Wang et al. |
| 2005/0174463 | A1 | 8/2005 | Ohzawa et al. |
| 2006/0274433 | A1 | 12/2006 | Kamo |
| 2012/0170142 | A1* | 7/2012 | Hsieh ................. G02B 27/0025 359/762 |
| 2016/0327780 | A1 | 11/2016 | Kamo et al. |

(Continued)

FOREIGN PATENT DOCUMENTS

| CN | 201438236 B | 4/2010 |
| CN | 107577031 A | 1/2018 |

(Continued)

*Primary Examiner* — Darryl J Collins
(74) *Attorney, Agent, or Firm* — McClure, Qualey & Rodack, LLP

(57) ABSTRACT

A wide-angle lens assembly includes a first lens group with negative refractive power, a second lens group with negative refractive power, a third lens group with positive refractive power, a fourth lens group with positive refractive power and a fifth lens group with positive refractive power. The first lens group includes a first lens, the second lens group includes a second lens, and the third lens group includes a third lens. The wide-angle lens assembly satisfies: $0.5<|f_{LG_4}/f_{LG_5}|<1.8$, where $f_{LG_4}$ is an effective focal length of the fourth lens group, and $f_{LG_5}$ is an effective focal length of the fifth lens group.

16 Claims, 21 Drawing Sheets

(56) References Cited

U.S. PATENT DOCUMENTS

2017/0371133 A1* 12/2017 Lai ..................... G02B 13/006
2020/0200998 A1*  6/2020 Wei ..................... G02B 7/008

FOREIGN PATENT DOCUMENTS

| TW | 201430374 A | 8/2014 |
| TW | 201730619 A | 9/2017 |
| TW | 201802517 A | 1/2018 |

\* cited by examiner

Transverse Ray Fan Plot

OBJ : 90.50 DEG

Transverse Ray Fan Plot

OBJ : 20.00 DEG

Transverse Ray Fan Plot

OBJ : 91.00 DEG

Transverse Ray Fan Plot

WIDE-ANGLE LENS ASSEMBLY

CROSS REFERENCE TO RELATED APPLICATIONS

This application claims priority of China Patent Application No. 201910293468.7, filed on Apr. 12, 2019, the entirety of which is incorporated by reference herein.

BACKGROUND OF THE INVENTION

Field of the Invention

The invention relates to a wide-angle lens assembly.

Description of the Related Art

The total lens length and the effective focal length of current wide-angle lens assembly with field of 180 degrees are too long to satisfy current requirements. Therefore, a wide-angle lens assembly with new structure to meet the requirements of shortened total lens length, shortened effective focal length and wider field of view is needed.

BRIEF SUMMARY OF THE INVENTION

The invention provides a wide-angle lens assembly to solve the above problems. The wide-angle lens assembly of the invention is provided with characteristics of a shortened total lens length, a shortened effective focal length, a wider field of view and still has a good optical performance.

The wide-angle lens assembly in accordance with an embodiment of the invention includes a first lens group with negative refractive power, a second lens group with negative refractive power, a third lens group with positive refractive power, a fourth lens group with positive refractive power and a fifth lens group with positive refractive power. The first lens group includes a first lens, the second lens group includes a second lens, and the third lens group includes a third lens. The first lens group, the second lens group, the third lens group, the fourth lens group and the fifth lens group are arranged in order from an object side to an image side along an optical axis. The wide-angle lens assembly satisfies: $0.5<|f_{LG_4}/f_{LG_5}|<1.8$, where $f_{LG_4}$ is an effective focal length of the fourth lens group, and $f_{LG_5}$ is an effective focal length of the fifth lens group.

In another embodiment, the fourth lens group or the fifth lens group includes a sixth lens.

In yet another embodiment, the fourth lens group includes a fourth lens and a sixth lens, the fifth lens group includes a fifth lens, the first lens is with negative refractive power, the second lens is with negative refractive power, the third lens is with positive refractive power, the fourth lens is with positive refractive power, and the fifth lens is with positive refractive power.

In another embodiment, the fourth lens group includes a fourth lens when the fifth lens group includes the sixth lens, the first lens is with negative refractive power, the second lens is with negative refractive power, the third lens is with positive refractive power, the fourth lens is with positive refractive power, and the fifth lens is with positive refractive power.

In yet another embodiment, the sixth lens is with negative refractive power.

In another embodiment, the fifth lens group includes a fifth lens, and the wide-angle lens assembly satisfies $10.6<TTL/T_6<29$, where TTL is a distance between an object side surface of the first lens and an image plane along the optical axis, and $T_6$ is a thickness of the lens closest to the image side along the optical axis.

In yet another embodiment, the wide-angle lens assembly satisfies $19<TTL/T_1<24$, where TTL is a distance between an object side surface of the first lens and an image plane along the optical axis, and $T_1$ is a thickness of the first lens along the optical axis.

In another embodiment, the wide-angle lens assembly satisfies $7.5<TTL/T_3<9.6$, where TTL is a distance between an object side surface of the first lens and an image plane along the optical axis, and $T_3$ is a thickness of the third lens along the optical axis.

In yet another embodiment, the wide-angle lens assembly satisfies $-3.4<f_{LG_1}/f<f_{LG_2}/f<f_{LG_3}/f<3.8$, where f is a effective focal length of the wide-angle lens assembly, $f_{LG_1}$ is a effective focal length of the first lens group, $f_{LG_2}$ is a effective focal length of the second lens group, and $f_{LG_3}$ is a effective focal length of the third lens group.

In another embodiment, the wide-angle lens assembly satisfies $1<|f_{LG_1}/f_{LG_2}|<1.8$ and $2.5<|f_{LG_3}/f|<3.8$, where f is a effective focal length of the wide-angle lens assembly, $f_{LG_1}$ is a effective focal length of the first lens group, $f_{LG_2}$ is a effective focal length of the second lens group, and $f_{LG_3}$ is a effective focal length of the third lens group.

In yet another embodiment, the fifth lens group includes a fifth lens, and the wide-angle lens assembly satisfies $TTL/f<11$ and $BFL/TTL>0.22$, where TTL is a distance between an object side surface of the first lens and an image plane along the optical axis, f is a effective focal length of the wide-angle lens assembly, and BFL is a distance between an image side surface of the fifth lens and the imaging surface along the optical axis.

In another embodiment, the wide-angle lens assembly satisfies $0.5<|Vd_1/Vd_2|<1.1$ and $21.6<|Vd_2/Nd_2|<47.3$, where TTL is a distance between an object side surface of the first lens and an image plane along the optical axis, $T_1$ is a thickness of the first lens along the optical axis, $T_6$ is a thickness of the sixth lens along the optical axis, $Vd_1$ is an Abbe number of the first lens. $Vd_2$ is an Abbe number of the second lens, and $Nd_2$ is a refractive index of the second lens.

In yet another embodiment, the first lens includes a convex surface facing the object side and a concave surface facing the image side, the third lens includes a convex surface facing the object side and another convex surface facing the image side, the fourth lens includes a convex surface facing the object side and another convex surface facing the image side, and the fifth lens includes a convex surface facing the object side and another convex surface facing the image side.

In another embodiment, the second lens includes a flat surface facing the object side and a concave surface facing the image side, and the sixth lens includes a concave surface facing the object side and another concave surface facing the image side.

In yet another embodiment, the second lens includes a convex surface facing the object side and a concave surface facing the image side, the sixth lens includes a concave surface facing the object side and a convex surface facing the image side.

In another embodiment, the sixth lens is with negative refractive power.

In yet another embodiment, the sixth lens includes a concave surface facing the object side and another concave surface facing the image side.

In another embodiment, the sixth lens includes a concave surface facing the object side and a convex surface facing the image side.

In yet another embodiment, the second lens includes a flat surface facing the object side and a concave surface facing the image side, and the sixth lens includes a concave surface facing the object side and another concave surface facing the image side.

In another embodiment, the wide-angle lens assembly satisfies TTL/f<11, $1<|f_{LG_1}/f_{LG_2}|<1.8$, $7.5<TTL/T_3<9.6$, $-3.4<f_{LG_1}/f<f_{LG_2}/f<f_{LG_3}/f<3.8$, and $2.5<|f_{LG_3}/f|<3.8$, wherein TTL is a distance between an object side surface of the first lens and an image plane along the optical axis, f is a effective focal length of the wide-angle lens assembly, $f_{LG_1}$ is a effective focal length of the first lens group, $f_{LG_2}$ is a effective focal length of the second lens group, $f_{LG_3}$ is a effective focal length of the third lens group, and $T_3$ is a thickness of the third lens along the optical axis.

In yet another embodiment, the fifth lens group includes a fifth lens, and the wide-angle lens assembly satisfies $19<TTL/T_1<24$, BFL/TTL>0.22, $0.5<|Vd_1/Vd_2|<1.1$, and $21.6<|Vd_2/Nd_2|<47.3$, wherein TTL is a distance between an object side surface of the first lens and an image plane along the optical axis, $T_1$ is a thickness of the first lens along the optical axis, BFL is a distance between an image side surface of the fifth lens and the imaging surface along the optical axis, $Vd_1$ is an Abbe number of the first lens, $Vd_2$ is an Abbe number of the second lens, and $Nd_2$ is a refractive index of the second lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The invention provides a wide-angle lens assembly including a first lens group with negative refractive power, a second lens group with negative refractive power, a third lens group with positive refractive power, a fourth lens group with positive refractive power and a fifth lens group with positive refractive power. The first lens group includes a first lens with negative refractive power, and the first lens includes a convex surface facing an object side. The second lens group includes a second lens with negative refractive power. The third lens group includes a third lens with positive refractive power. The fifth lens group includes a sixth lens, and the sixth lens includes a convex surface facing an image side. The first lens group, the second lens group, the third lens group, the fourth lens group and the fifth lens group are arranged in order from the object side to the image side along an optical axis. The wide-angle lens assembly satisfies: $7.5<TTL/T_3<9.6$, where TTL is a distance between an object side surface of the first lens and an image plane along the optical axis, and $T_3$ is a thickness of the third lens along the optical axis.

The invention provides another wide-angle lens assembly including a first lens group with negative refractive power, a second lens group with negative refractive power, a third lens group with positive refractive power, a fourth lens group with positive refractive power and a fifth lens group with positive refractive power. The first lens group includes a first lens with negative refractive power, and the first lens includes a convex surface facing an object side. The second lens group includes a second lens with negative refractive power. The third lens group includes a third lens with positive refractive power. The fifth lens group includes a sixth lens, and the sixth lens includes a convex surface facing an image side. The first lens group, the second lens group, the third lens group, the fourth lens group and the fifth lens group are arranged in order from the object side to the image side along an optical axis. The wide-angle lens assembly satisfies: $10.6<TTL/T_6<29$, where TTL is a distance between an object side surface of the first lens and an image plane along the optical axis, and $T_6$ is a thickness of the sixth lens along the optical axis.

Referring to following Tables 1 and 3, the wide-angle lens assemblies in accordance with first and second embodiments of the invention are provided with the optical specifications shown in Table 1 and 3.

Figure 1:
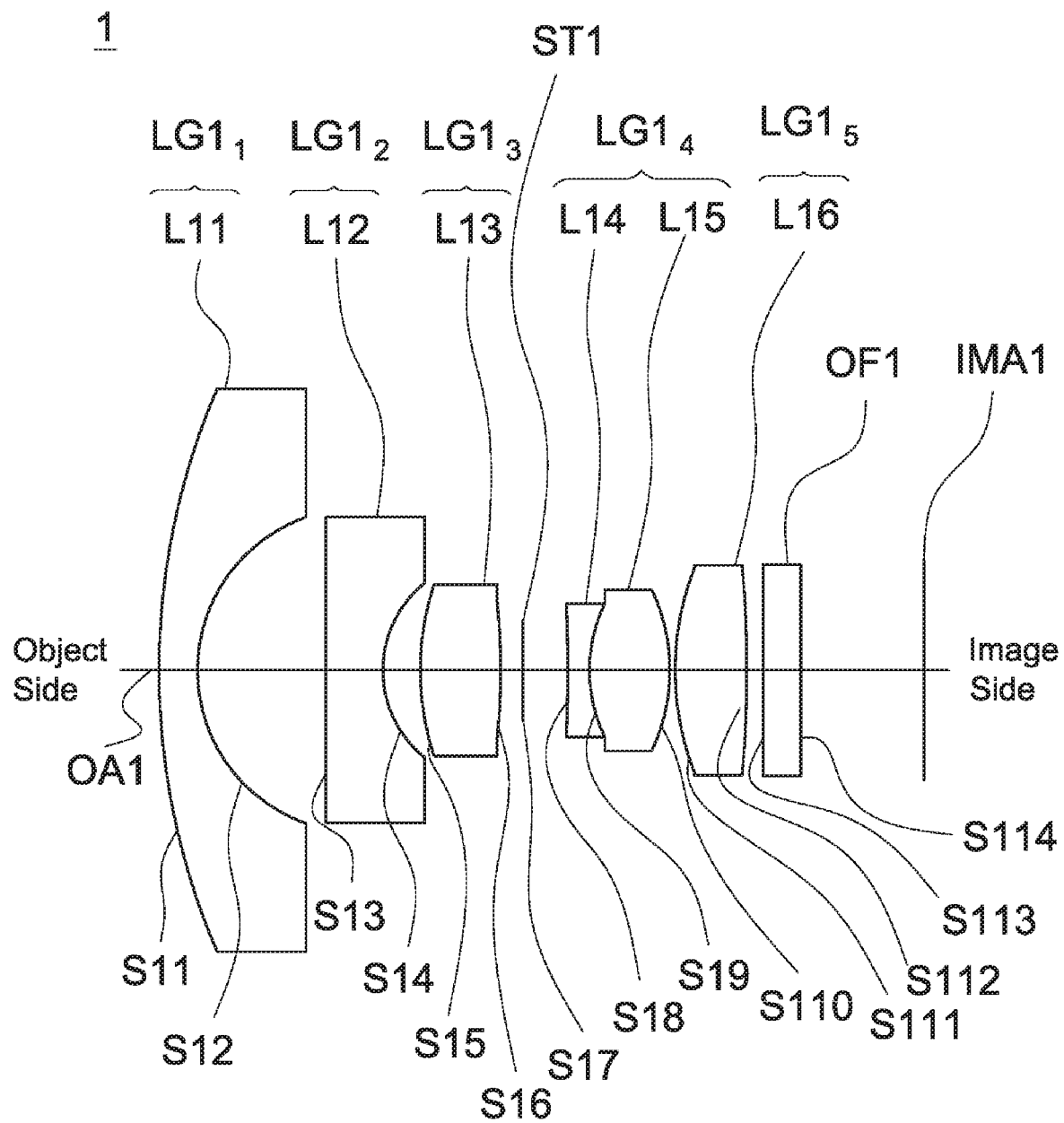
FIG. 1 is a lens layout diagram of a wide-angle lens assembly in accordance with a first embodiment of the invention.
Figure 3:
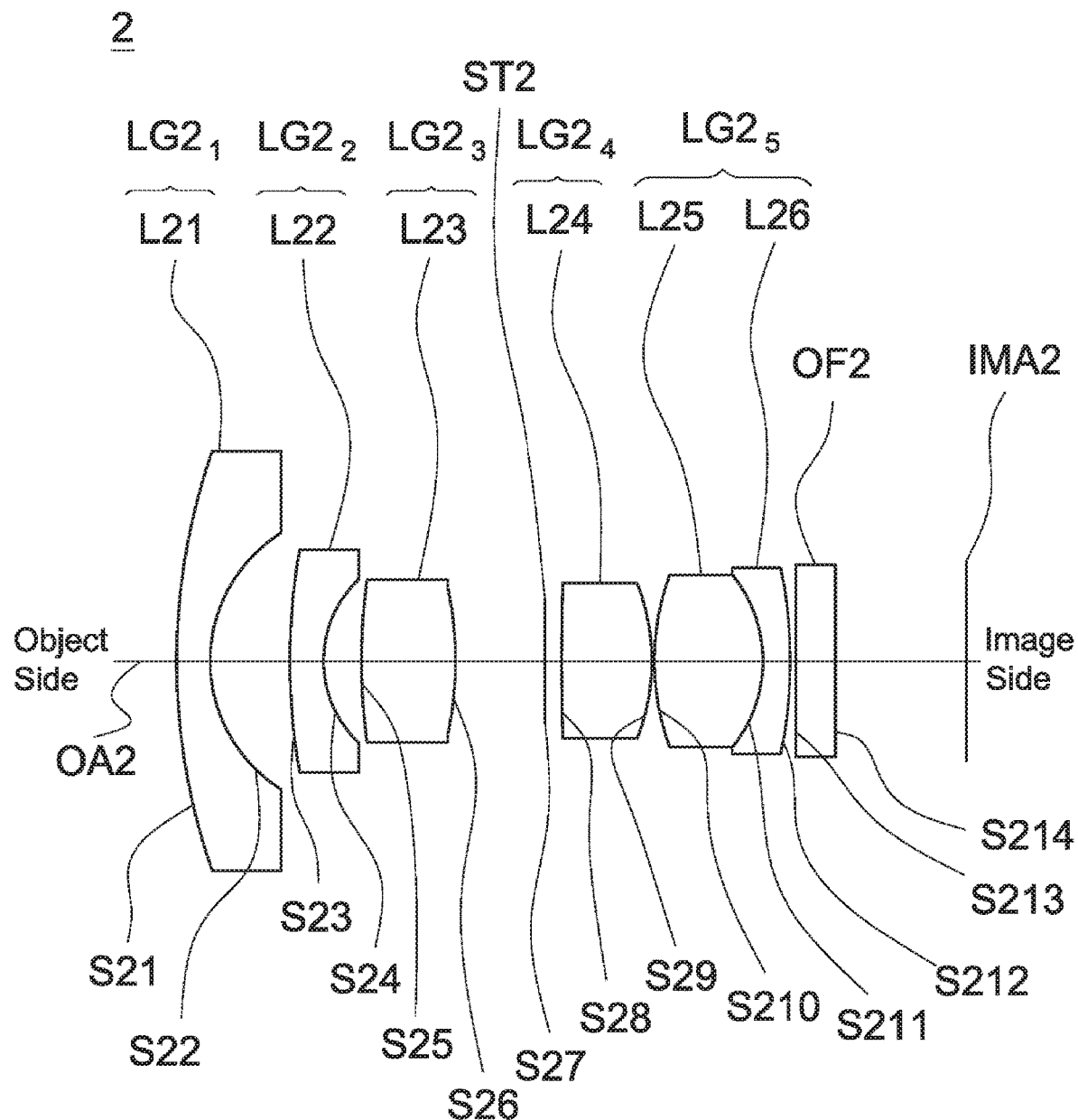
FIG. 3 is a lens layout diagram of a wide-angle lens assembly in accordance with a second embodiment of the invention.

FIGS. 1 and 3 are lens layout diagrams of the wide-angle lens assemblies in accordance with the first and the second embodiments of the invention. As shown in FIGS. 1 and 3, the first lens groups $LG1_1$, $LG2_1$ are with negative refractive power and respectively include the first lenses L11, L21. The second lens groups $LG1_2$, $LG2_2$ are with negative refractive power and respectively include the second lenses L12, L22. The third lens groups $LG1_3$, $LG2_3$ are with positive refractive power and respectively include the third lenses L13. L23. As shown in FIG. 1, the fourth lens group $LG1_4$ is with positive refractive power and includes the sixth lens L14 and the fourth lens L15, and the fifth lens group $LG1_5$ is with positive refractive power and includes the fifth lens L16. As shown in FIG. 3, the fourth lens group $LG2_4$ is with positive refractive power and includes the fourth lens L24, and the fifth lens group LG2₅ is with positive refractive power and includes the fifth lens L25 and the sixth lens L26.

The first lenses L11, L21 are with negative refractive power, and the object side surfaces S11, S21 are convex surfaces. The object side surfaces S11, S21 and the image side surfaces S12, S22 are spherical surfaces.

The second lenses L12, L22 are with negative refractive power, and the object side surfaces S13, S23 and the image side surfaces S4, S24 are spherical surfaces.

The third lenses L13, L23 are with positive refractive power, and the object side surfaces S15, S25 and the image side surfaces S16, S26 are spherical surfaces.

The object side surface S18 and the image side surface S19 of the sixth lens L14 are spherical surfaces. The object side surface S28 and the image side surface S29 of the fourth lens L24 are spherical surfaces.

The object side surface S19 and the image side surface S110 of the fourth lens L15 are spherical surfaces. The object side surface S210 and the image side surface S211 of the fifth lens L25 are spherical surfaces.

The image side surface S112 of the fifth lens L16 is a convex surface. The object side surface S111 and the image side surface S112 of the fifth lens L16 are spherical surfaces. The image side surface S212 of the sixth lens L26 is a convex surface. The object side surface S211 and the image side surface S212 of the sixth lenses L26 are spherical surfaces.

The wide-angle lens assemblies 1, 2 satisfy at least one of the following conditions:

$$7.5 < TTL/T_3 < 9.6 \quad (1)$$

$$10.6 < TTL/T_6 < 29 \quad (2)$$

$$TTL/f < 11 \quad (3)$$

$$BFL/TTL > 0.22 \quad (4)$$

$$19 < TTL/T_1 < 24 \quad (5)$$

$$1 < |f_{LG_1}/f_{LG_2}| < 1.8 \quad (6)$$

$$0.5 < |f_{LG_4}/f_{LG_5}| < 1.8 \quad (7)$$

$$0.5 < |Vd_1/Vd_2| < 1.1 \quad (8)$$

$$21.6 < |Vd_2/Nd_2| < 47.3 \quad (9)$$

$$-3.4 < f_{LG_1}/f < f_{LG_2}/f < f_{LG_3}/f < 3.8 \quad (10)$$

$$2.5 < |f_{LG_3}/f| < 3.8 \quad (11)$$

wherein f is an effective focal length of the wide-angle lens assemblies 1, 2 of the first and the second embodiments, $f_{LG_1}$ is an effective focal length of the first lens groups LG1₁, LG2₁ of the first and the second embodiments, $f_{LG_2}$ is an effective focal length of the second lens groups LG1₂, LG2₂ of the first and the second embodiments, $f_{LG_3}$ is an effective focal length of the third lens groups LG1₃, LG2₃ of the first and the second embodiments, $f_{LG_4}$ is an effective focal length of the fourth lens groups LG1₄, LG2₄ of the first and the second embodiments, $f_{LG_5}$ is an effective focal length of the fifth lens groups LG1₅, LG2₅ of the first and the second embodiments, Vd₁ is an Abbe number of the first lenses L11, L21 of the first and the second embodiments, Vd₂ is an Abbe number of the second lenses L12, L22 of the first and the second embodiments, Nd₂ is a refractive index of the second lenses L12. L22 of the first and the second embodiments, TTL is a distance between the object side surfaces S11, S21 of the first lenses L11, L21 of the first and the second embodiments to image planes IMA1, IMA2 along optical axes OA1, OA2, BFL is a distance between the image side surface S12 of the fifth lens L16 of the first embodiment to the image plane IMA1 along the optical axis OA1 or is a distance between the image side surface S212 of the sixth lens L26 of the second embodiment to the image plane IMA2 along the optical axis OA2, T₁ is a thickness of the first lenses L11, L21 along the optical axes OA1, OA2, T₃ is a thickness of the third lenses L13, L23 along the optical axes OA1. OA2, and T₆ is a thickness of the lenses L16, L26 closest to the image side along the optical axes OA1, OA2. Specifically, T₆ is a thickness of the fifth lens L16 in the first embodiment, or is a thickness of the sixth lens L26 in the second embodiment. By such arrangement, the wide-angle lens assemblies 1, 2 can be effectively improved to have shortened total lens length, shortened effective focal length, increased field of view and corrected aberration. Further, when a light ray passes through a wide-angle lens assembly and reaches an image sensor, the angle at which the light ray is incident on the image sensor (i.e. the chief ray angle) can be effectively suppressed if the wide-angle lens assembly satisfies the condition (7), i.e. $0.5 < |f_{LG_4}/f_{LG_5}| < 1.8$.

The wide-angle lens assembly in accordance with the first embodiment of the invention is described herein. Referring to FIG. 1, the wide-angle lens assembly 1 from an object side to an image side along an optical axis OA1 includes a first lens group LG1₁, a second lens group LG1₂, a third lens group LG1₃, a stop ST1, a fourth lens group LG1₄, a fifth lens group LG1₅, and an optical filter OF1. The first lens group LG1₁ is with negative refractive power and includes a first lens L11. The second lens group LG1₂ is with negative refractive power and includes a second lens L12. The third lens group LG1₃ is with positive refractive power and includes a third lens L13. The fourth lens group LG1₄ is with positive refractive power and includes a sixth lens L14 and a fourth lens L15, and the sixth lens L14 and the fourth lens L15 are cemented together. The fifth lens group LG1₅ is with positive refractive power and includes a fifth lens L16. In operation, an image of light rays from the object side is formed at an image plane IMA1. The wide-angle lens assembly of the first embodiment can be further specified, according to first to tenth paragraphs of the DETAILED DESCRIPTION OF THE INVENTION, as below:

The first lens L11 can be a meniscus lens, and an image side surface S12 thereof is a concave surface. The second lens L12 can be a plano-concave lens, an object side surface S13 thereof is a flat surface, and an image side surface S14 thereof is a concave surface. The third lens L13 can be a biconvex lens, an object side surface S15 thereof is a convex surface, and an image side surface S16 thereof is a convex surface. The sixth lens L14 can be a biconcave lens with negative refractive power, an object side surface S18 thereof is a concave surface, and an image side surface S19 thereof is a concave surface. The fourth lens L15 can be a biconvex lens with positive refractive power, an object side surface S19 thereof is a convex surface, and an image side surface S110 thereof is a convex surface. The fifth lens L16 can be a biconvex lens with positive refractive power, and an object side surface S111 thereof is a convex surface.

An object side surface S113 and an image side surface S114 of the optical filter OF1 are flat surfaces.

By the design of the above lenses, the stop ST1 and at least one of the conditions (1)-(11) satisfied, the wide-angle lens assembly 1 is able to have the total lens length effectively shortened, effective focal length effectively shortened, field of view effectively increased, and aberration effectively corrected.

The wide-angle lens assembly 1 of FIG. 1 is provided with the optical specifications shown in Table 1, which include radius of curvature of each lens surface, distance between adjacent surfaces, refractive index of each lens, Abbe number of each lens and focal length of each lens.

TABLE 1

Effective focal length = 1.42 mm Aperture value = 1.8
Total lens length = 14.2294 mm View angle = 181 degrees

| Surface Number | Radius of Curvature (mm) | Distance (mm) | Nd | Vd | Effective Focal Length (mm) | Remark |
|---|---|---|---|---|---|---|
| S11 | 13.19879 | 0.72 | 1.883 | 40.87 | −4.570986 | The first lens group $LG1_1$ The first lens L11 |
| S12 | 3.021962 | 2.400482 | | | | |
| S13 | ∞ | 1.063756 | 1.487 | 70.24 | −4.263378 | The second lens group $LG1_2$ The second lens L12 |
| S14 | 2.08379 | 0.7011686 | | | | |
| S15 | 5.148399 | 1.496958 | 1.946 | 17.94 | 4.09385 | The third lens group $LG1_3$ The third lens L13 |
| S16 | −13.96172 | 0.4251655 | | | | |
| S17 | ∞ | 0.8392904 | | | | The stop ST1 |
| S18 | −26.02052 | 0.4025145 | 1.946 | 17.94 | −2.695208 | The fourth lens group $LG1_4$ The sixth lens L14 |
| S19 | 2.879253 | 1.5 | 1.729 | 54.67 | 2.408096 | The fourth lens group $LG1_4$ The fourth lens L15 |
| S110 | −3.540116 | 0.1000098 | | | | |
| S111 | 5.193744 | 1.339823 | 1.804 | 46.59 | 5.30492 | The fifth lens group $LG1_5$ The fifth lens L16 |
| S112 | −21.5777 | 0.3 | | | | |
| S113 | ∞ | 0.71 | 1.517 | 64.17 | | The optical filter OF1 |
| S114 | ∞ | 2.30227 | | | | |

Table 2 shows the optical specifications of the wide-angle lens assembly 1 and calculated values corresponding to the conditions (1)-(11). It can be seen from Table 2 that the wide-angle lens assembly 1 can meet requirements of the conditions (1)-(11).

TABLE 2

| | | | | | |
|---|---|---|---|---|---|
| $f_{LG_1}$ | −4.57098 mm | $f_{LG_2}$ | −4.26337 mm | $f_{LG_3}$ | 4.09385 mm |
| $f_{LG_4}$ | 8.78758 mm | $f_{LG_5}$ | 5.30492 mm | BFL | 3.31 mm |
| $T_1$ | 0.72 mm | $T_3$ | 1.49695 mm | $T_6$ | 1.339823 mm |
| TTL/$T_3$ | 9.55 | TTL/$T_6$ | 10.67 | TTL/f | 10.02 |
| BFL/TTL | 0.23 | TTL/$T_1$ | 19.86 | $\lvert f_{LG_1}/f_{LG_2} \rvert$ | 1.07 |
| $\lvert f_{LG_4}/f_{LG_5} \rvert$ | 1.66 | $\lvert Vd_1/Vd_2 \rvert$ | 0.58 | $\lvert Vd_2/Nd_2 \rvert$ | 47.23 |
| $f_{LG_1}/f$ | −3.22 | $f_{LG_2}/f$ | −3.00 | $f_{LG_3}/f$ | 2.88 |

Figure 2A:
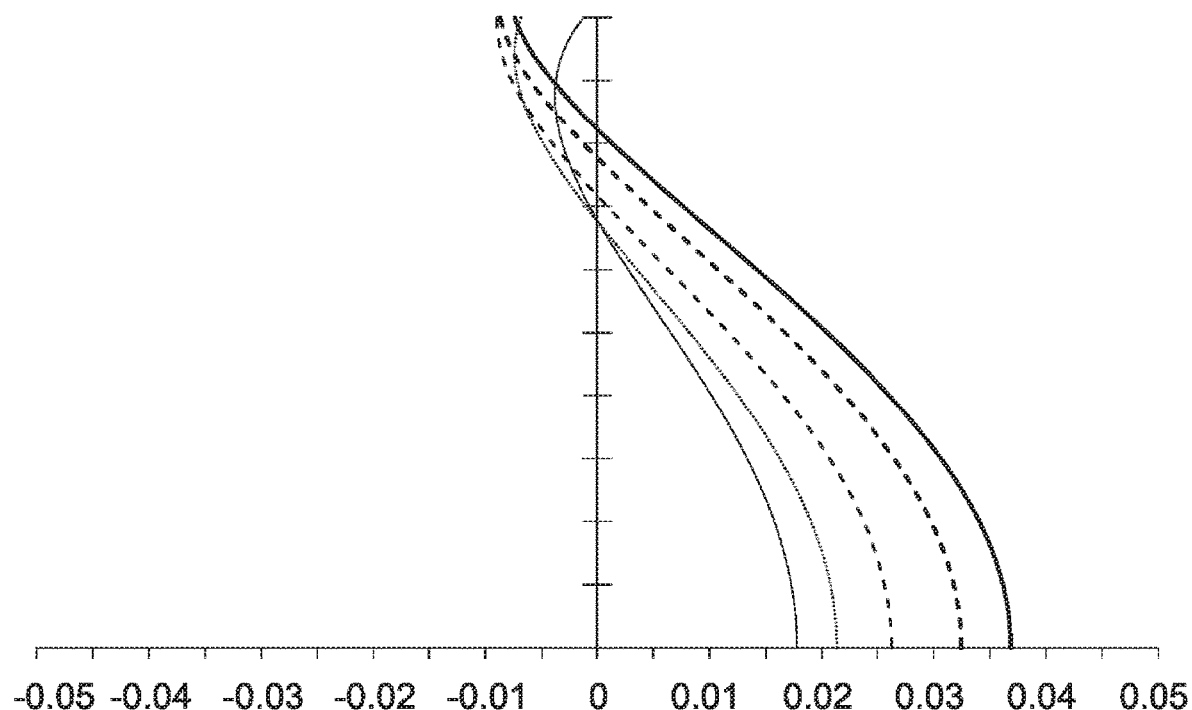
FIG. 2A is a longitudinal aberration diagram of the wide-angle lens assembly in accordance with the first embodiment of the invention.
Figure 2B:
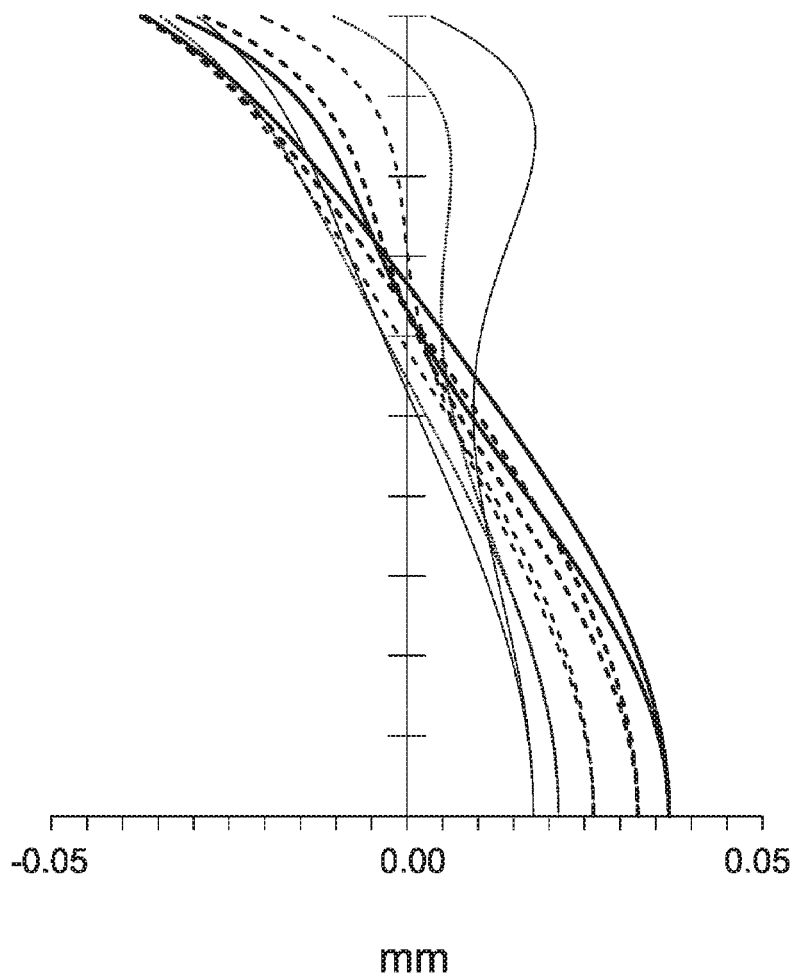
FIG. 2B is a field curvature diagram of the wide-angle lens assembly in accordance with the first embodiment of the invention.
Figure 2C:
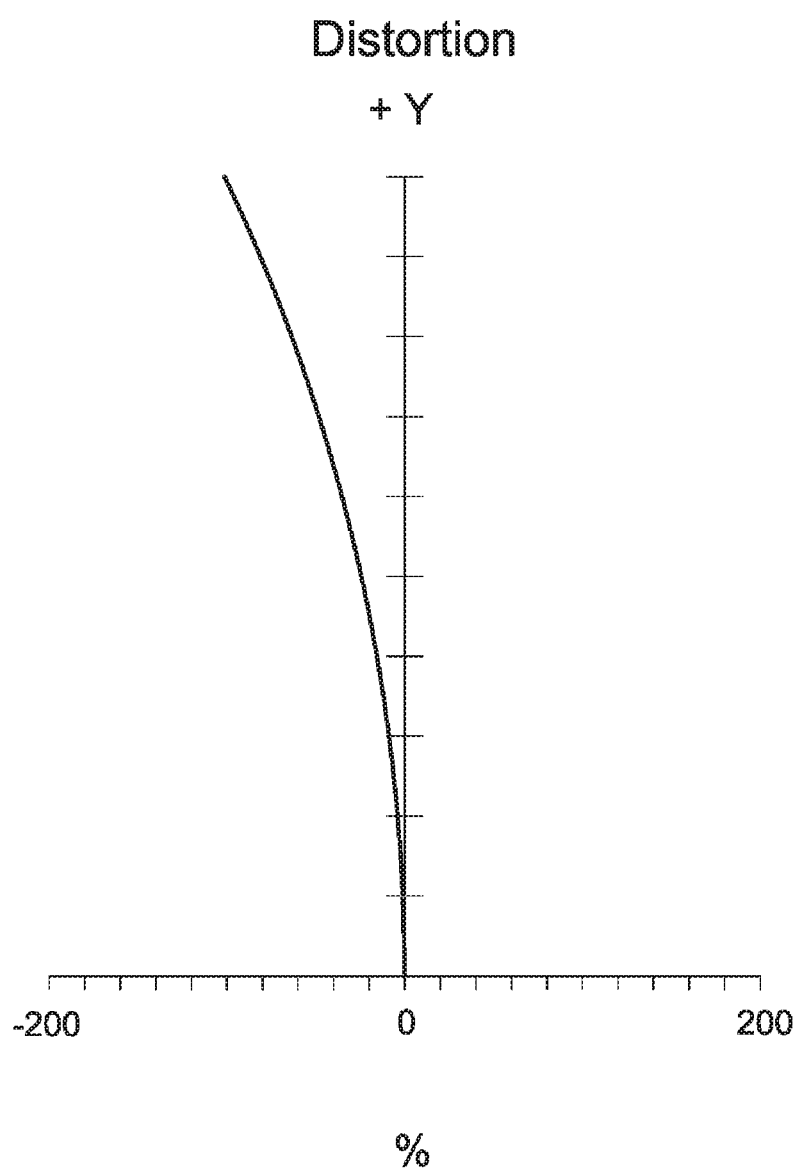
FIG. 2C is a distortion diagram of the wide-angle lens assembly in accordance with the first embodiment of the invention.
Figure 2D:
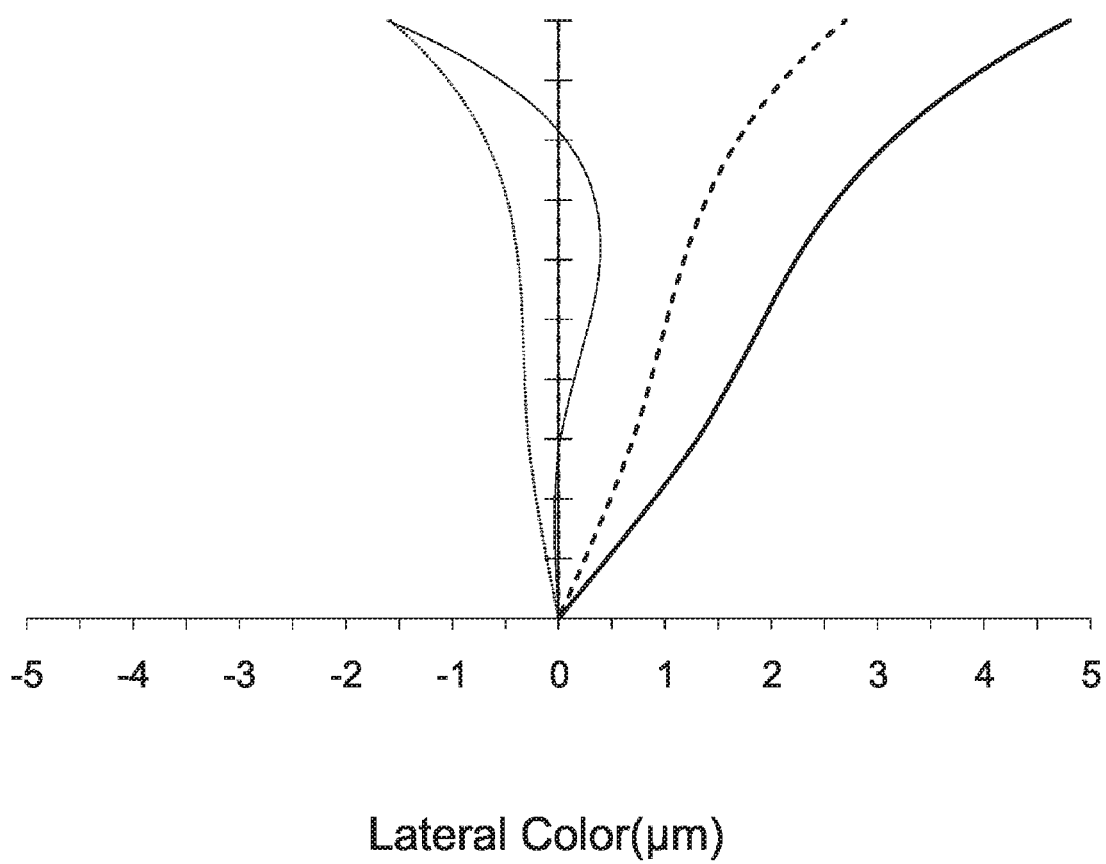
FIG. 2D is a lateral color diagram of the wide-angle lens assembly in accordance with the first embodiment of the invention.
Figure 2E:
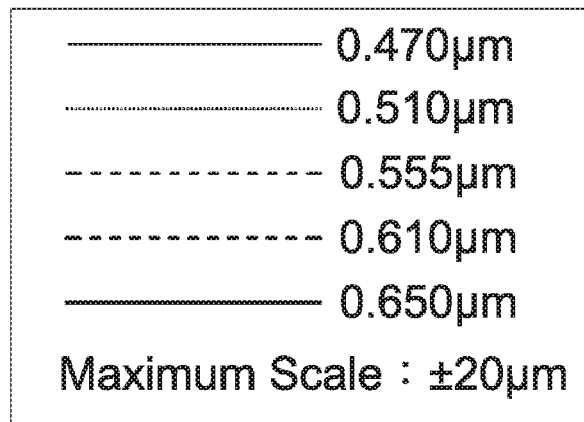
FIGS. 2E-2I are transverse ray fan diagrams of the wide-angle lens assembly in accordance with the first embodiment of the invention.
Figure 2E:
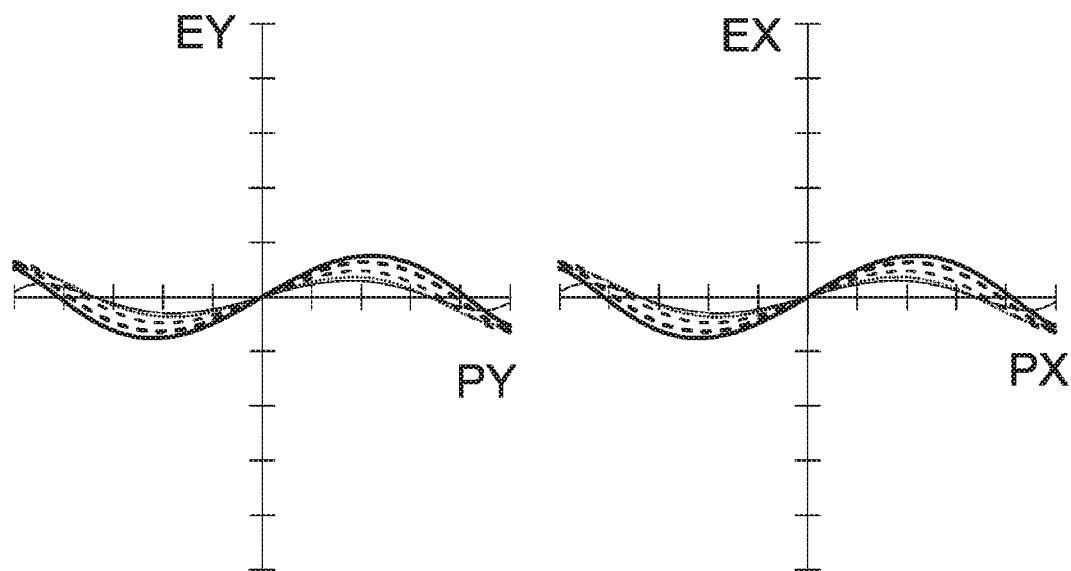
Figure 2F:
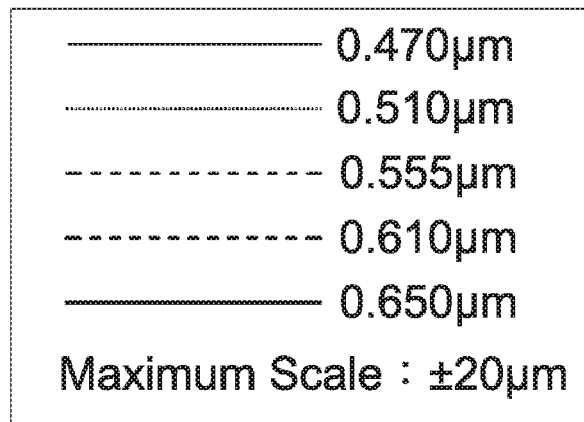
Figure 2F:
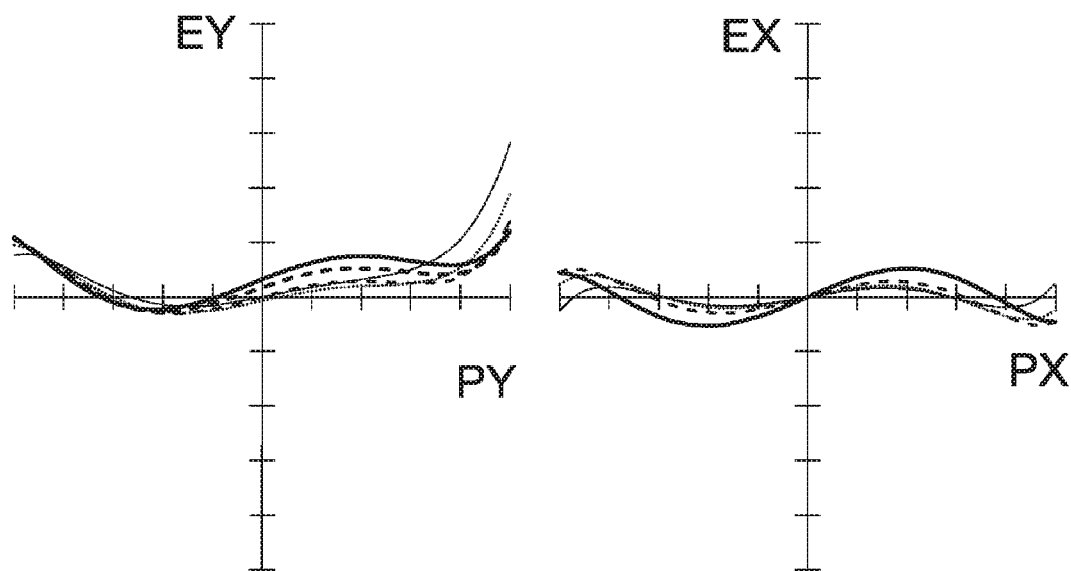
Figure 2G:
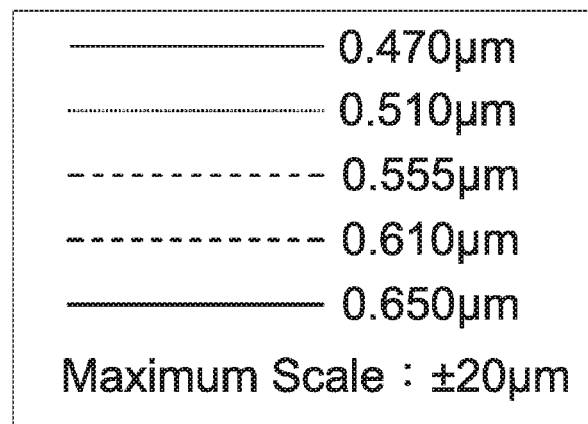
Figure 2G:
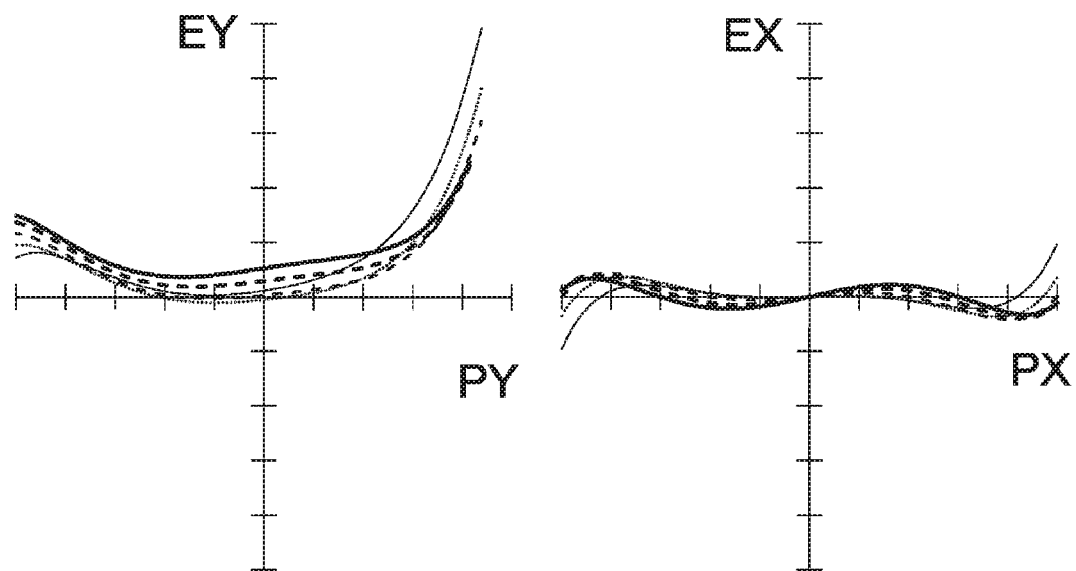
Figure 2H:
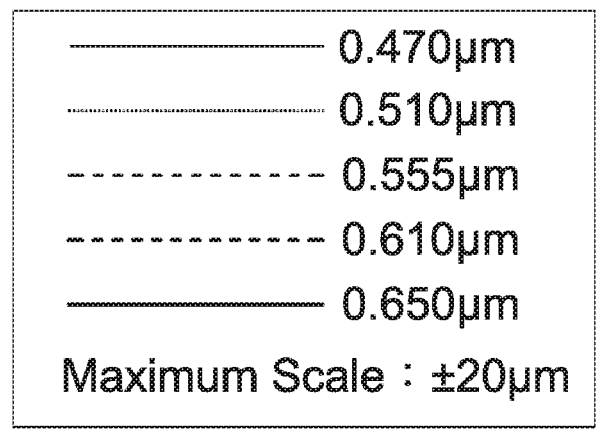
Figure 2H:
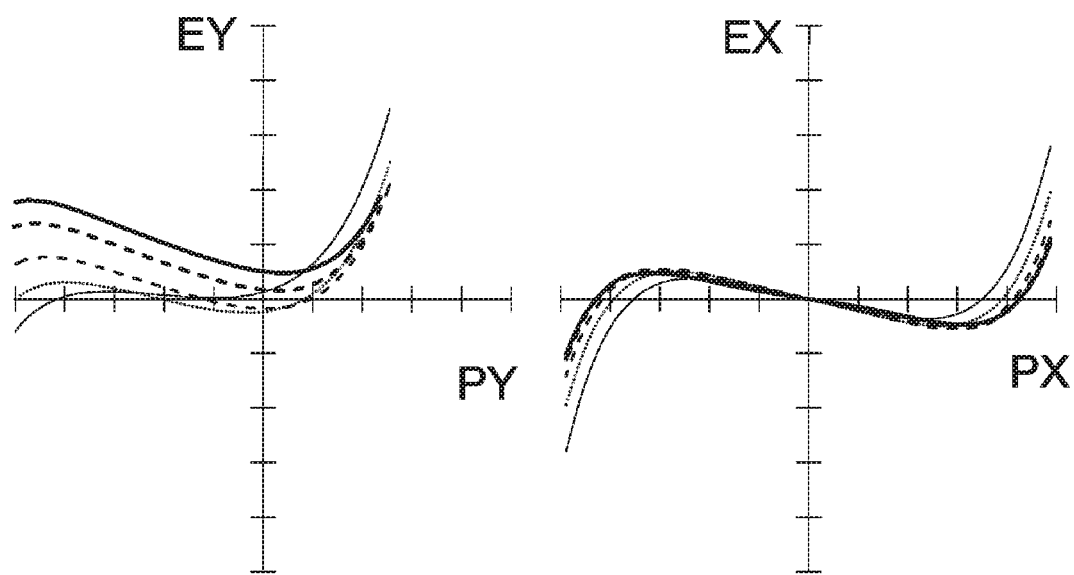
Figure 2I:
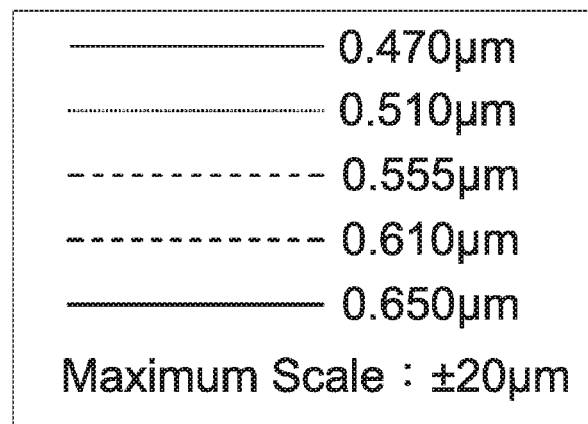
Figure 2I:
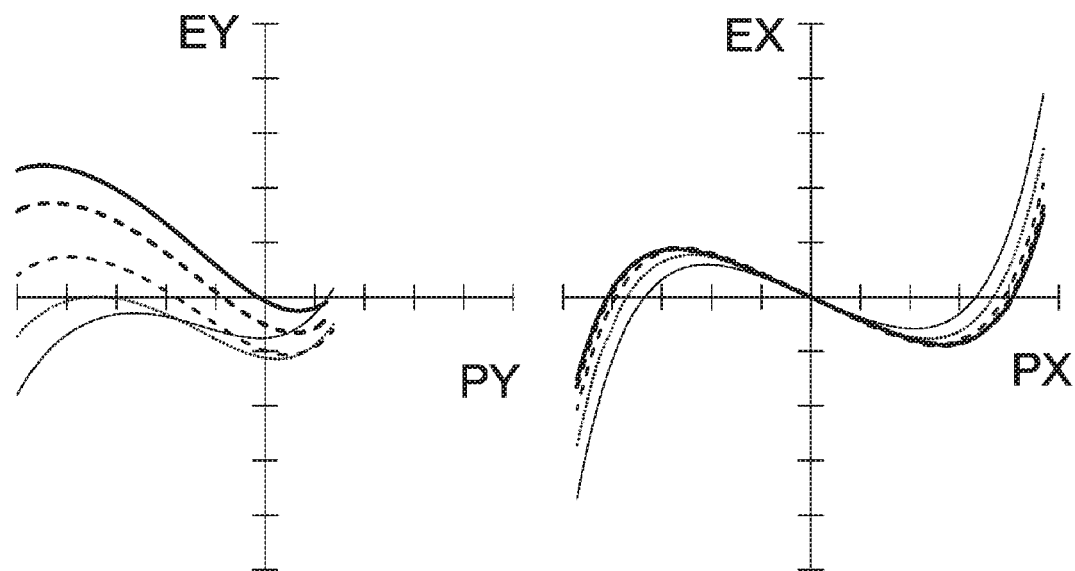

The wide-angle lens assembly 1 of the first embodiment can meet the requirements of optical performance as seen in FIGS. 2A-2I, wherein FIG. 2A shows the longitudinal aberration diagram of the wide-angle lens assembly 1 of the first embodiment, FIG. 2B shows the field curvature diagram of the wide-angle lens assembly 1 of the first embodiment, FIG. 2C shows the distortion diagram of the wide-angle lens assembly 1 of the first embodiment, FIG. 2D shows the lateral color diagram of the wide-angle lens assembly 1 of the first embodiment, and FIGS. 2E-2I show the transverse ray fan diagrams of the wide-angle lens assembly 1 of the first embodiment.

It can be seen from FIG. 2A that the longitudinal aberration in the wide-angle lens assembly 1 of the first embodiment ranges from −0.001 mm to 0.04 mm.

It can be seen from FIG. 2B that the field curvature of the wide-angle lens assembly 1 of the first embodiment ranges from −0.04 mm to 0.04 mm.

It can be seen from FIG. 2C that the distortion of the wide-angle lens assembly 1 of the first embodiment ranges from −100% to 0%.

It can be seen from FIG. 2D that the lateral color of the wide-angle lens assembly 1 of the first embodiment ranges from −2 μm to 5 μm.

It can be seen from FIGS. 2E-2I that the transverse ray fan of the wide-angle lens assembly 1 of the first embodiment ranges from −16 μm to 20 μm.

It is obvious that the longitudinal aberration, the field curvature, the distortion, the lateral color and the transverse ray aberration of the wide-angle lens assembly 1 of the first embodiment can be corrected effectively. Therefore, the wide-angle lens assembly 1 of the first embodiment is capable of good optical performance.

Referring to FIG. 3, FIG. 3 is a lens layout diagram of a wide-angle lens assembly in accordance with a second embodiment of the invention. A wide-angle lens assembly 2 from an object side to an image side along an optical axis OA2 includes a first lens group $LG2_1$, a second lens group $LG2_2$, a third lens group $LG2_3$, a stop ST2, a fourth lens group $LG2_4$, a fifth lens group $LG2_5$, and a optical filter OF21. The first lens group $LG2_1$ is with negative refractive power and includes a first lens L21. The second lens group $LG2_2$ is with negative refractive power and includes a second lens L22. The third lens group $LG2_3$ is with positive refractive power and includes a third lens L23. The fourth lens group $LG2_4$ is with positive refractive power and includes a fourth lens L24. The fifth lens group $LG2_5$ is with positive refractive power and includes a fifth lens L25 and a sixth lens L26, and the fifth lens L25 and the sixth lens L26 are cemented together. In operation, an image of light rays from the object side is formed at an image plane IMA2. The wide-angle lens assembly of the second embodiment can be further specified, according to first to tenth paragraphs of the DETAILED DESCRIPTION OF THE INVENTION, as below:

The first lens L21 can be a meniscus lens, shape of surfaces thereof are similar to those of the first lens L11 of the first embodiment, and therefore the descriptions thereof are omitted. The second lens L22 can be a meniscus lens, an object side surface S23 thereof is a convex surface, and an image side surface S24 thereof is a concave surface. The third lens L23 can be a biconvex lens, shape of surfaces thereof are similar to those of the third lens L13 of the first embodiment, and therefore the descriptions thereof are omitted. The fourth lens L24 can be a biconvex lens with positive refractive power, an object side surface S28 thereof is a convex surface, and an image side surface S29 thereof is a convex surface. The fifth lens L25 can be a biconvex lens with positive refractive power, shape of surfaces thereof are similar to those of the fifth lens L15 of the first embodiment, and therefore the descriptions thereof are omitted. The sixth lens L26 can be a meniscus lens with negative refractive power, and an object side surface S211 thereof is a concave surface.

An object side surface S213 and an image side surface S214 of the optical filter OF2 are flat surfaces.

By the design of the above lenses, the stop ST2 and at least one of the conditions (1)-(11) satisfied, the wide-angle lens assembly 2 is able to have the total lens length effectively shortened, effective focal length effectively shortened, field of view effectively increased, and aberration effectively corrected.

The wide-angle lens assembly 2 of FIG. 3 is provided with the optical specifications shown in Table 3, which include radius of curvature of each lens surface, distance between adjacent surfaces, refractive index of each lens, Abbe number of each lens and focal length of each lens.

TABLE 3

Effective focal length = 1.384 mm Aperture value = 1.8
Total lens length = 14.2274 mm View angle = 182 degrees

| Surface Number | Radius of Curvature (mm) | Distance (mm) | Nd | Vd | Effective Focal Length (mm) | Remark |
|---|---|---|---|---|---|---|
| S21 | 11.48625 | 0.6 | 1.883 | 40.81 | −4.633 | The first lens group $LG2_1$ The first lens L21 |
| S22 | 2.713992 | 1.442879 | | | | |
| S23 | 11.70557 | 0.6 | 1.883 | 40.81 | −2.82665 | The second lens group $LG2_2$ The second lens L22 |
| S24 | 2.01507 | 0.6912774 | | | | |
| S25 | 11.30402 | 1.687583 | 1.808 | 22.76 | 5.1365 | The third lens group $LG2_3$ The third lens L23 |
| S26 | −6.196195 | 1.615263 | | | | |
| S27 | ∞ | 0.2990324 | | | | The stop ST2 |
| S28 | 43.71384 | 1.625756 | 1.729 | 54.68 | 4.909725 | The fourth lens group $LG2_4$ The fourth lens L24 |
| S29 | −3.851993 | 0.04966387 | | | | |
| S210 | 4.566245 | 1.948209 | 1.595 | 67.74 | 2.984247 | The fifth lens group $LG2_5$ The fifth lens L25 |
| S211 | −2.4544 | 0.4984958 | 1.946 | 17.98 | −3.900626 | The fifth lens group $LG2_5$ The sixth lens L26 |
| S212 | −7.904159 | 0.1 | | | | |
| S213 | ∞ | 0.71 | 1.517 | 64.17 | | The optical filter OF2 |
| S214 | ∞ | 2.35926 | | | | |

Table 4 shows the optical specifications of the wide-angle lens assembly 2 and calculated values corresponding to the conditions (1)-(11). It can be seen from Table 4 that the wide-angle lens assembly 2 can meet requirements of the conditions (1)-(11).

TABLE 4

| $f_{LG_1}$ | −4.633 mm | $f_{LG_2}$ | −2.82665 mm | $f_{LG_3}$ | 5.1365 mm |
|---|---|---|---|---|---|
| $F_{LG_4}$ | 4.90972 mm | $f_{LG_5}$ | 9.15075 mm | BFL | 3.169 mm |
| $T_1$ | 0.6 mm | $T_3$ | 0.6 mm | $T_6$ | 0.49849 mm |
| $TTL/T_3$ | 8.43 | $TTL/T_6$ | 28.54 | $TTL/f$ | 10.28 |
| $BFL/TTL$ | 0.22 | $TTL/T_1$ | 23.71 | $|f_{LG_1}/f_{LG_2}|$ | 1.64 |
| $|f_{LG_4}/f_{LG_5}|$ | 0.54 | $|Vd_1/Vd_2|$ | 1 | $|Vd_2/Nd_2|$ | 21.67 |
| $f_{LG_1}/f$ | −3.35 | $f_{LG_2}/f$ | −2.04 | $f_{LG_3}/f$ | 3.71 |

Figure 4A:
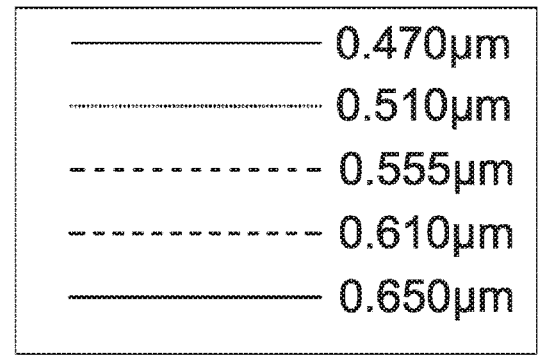
FIG. 4A is a longitudinal aberration diagram of the wide-angle lens assembly in accordance with the second embodiment of the invention.
Figure 4A:
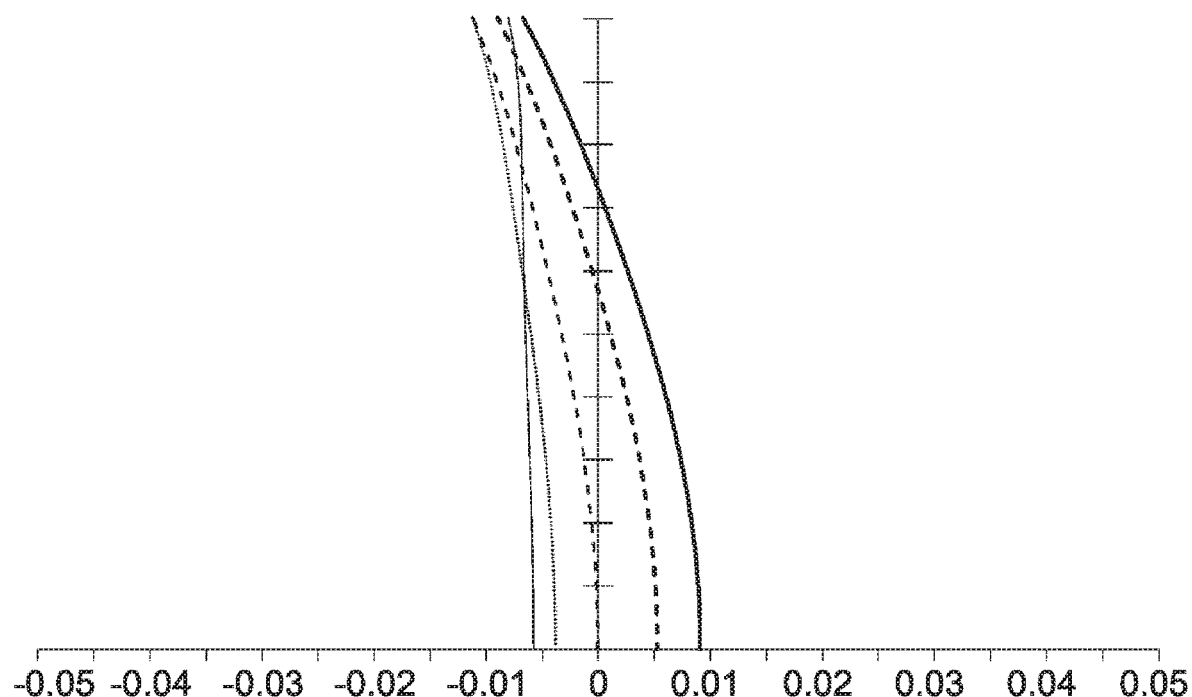
Figure 4B:
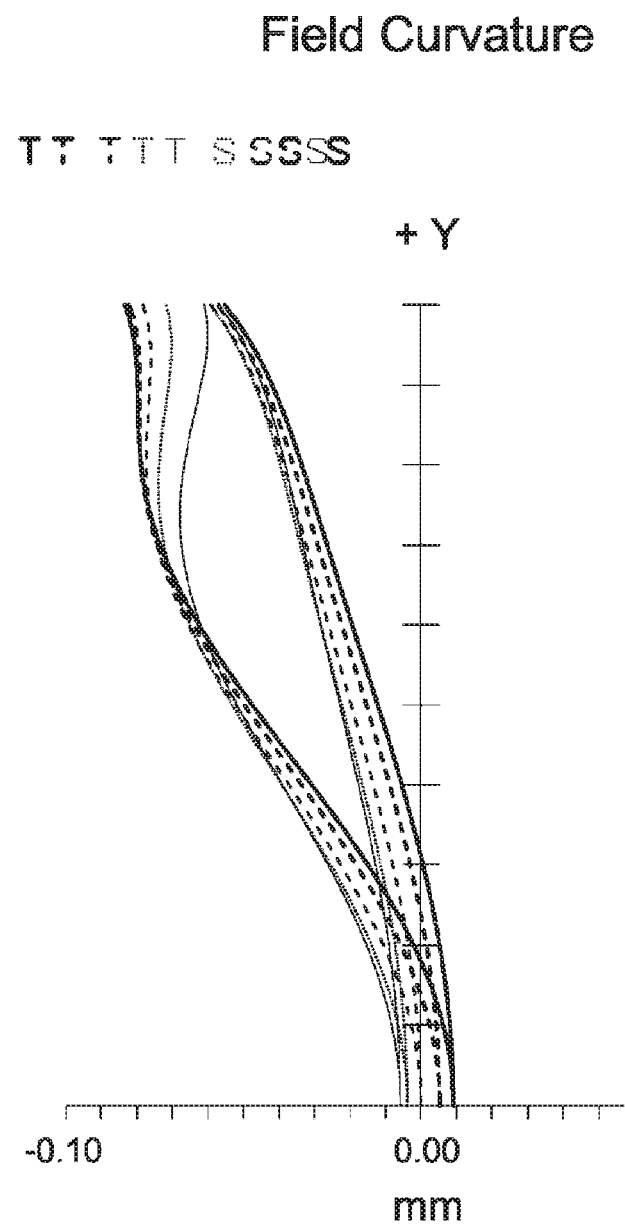
FIG. 4B is a field curvature diagram of the wide-angle lens assembly in accordance with the second embodiment of the invention.
Figure 4C:
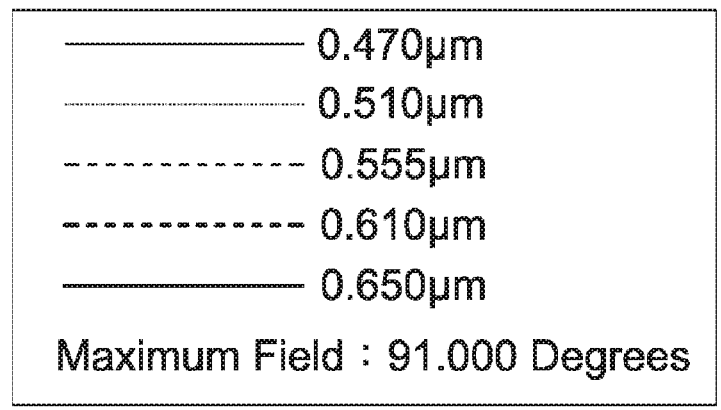
FIG. 4C is a distortion diagram of the wide-angle lens assembly in accordance with the second embodiment of the invention.
Figure 4C:
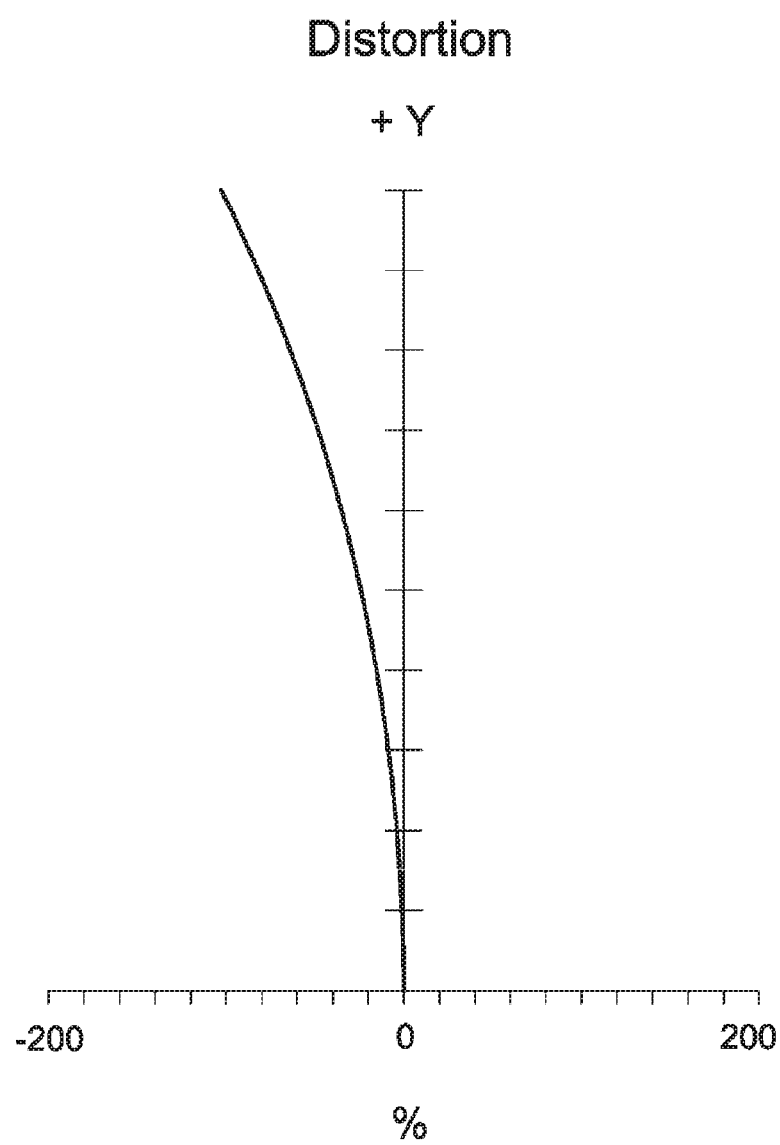
Figure 4D:
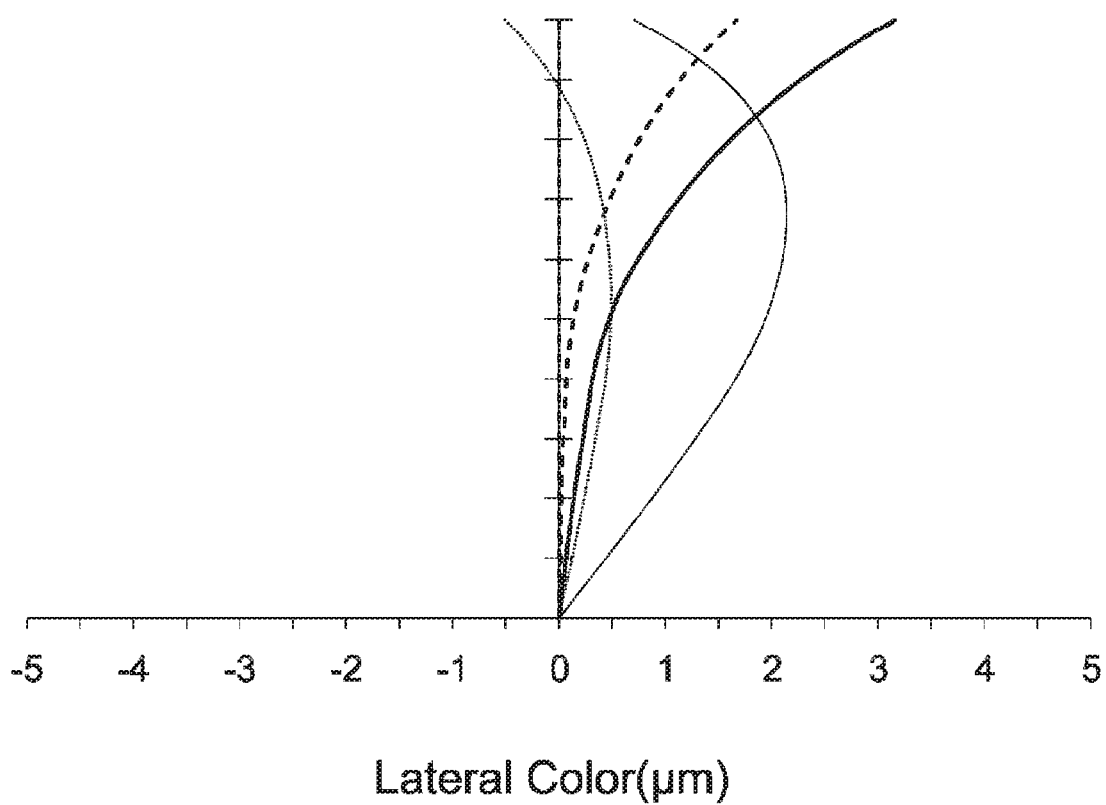
FIG. 4D is a lateral color diagram of the wide-angle lens assembly in accordance with the second embodiment of the invention.
Figure 4E:
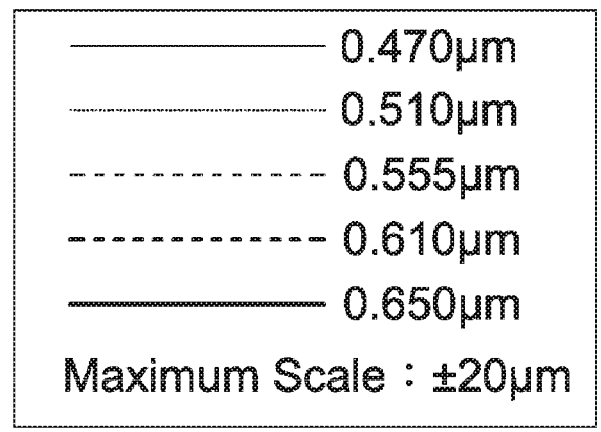
FIGS. 4E-4J are transverse ray fan diagrams of the wide-angle lens assembly in accordance with the second embodiment of the invention.
Figure 4E:
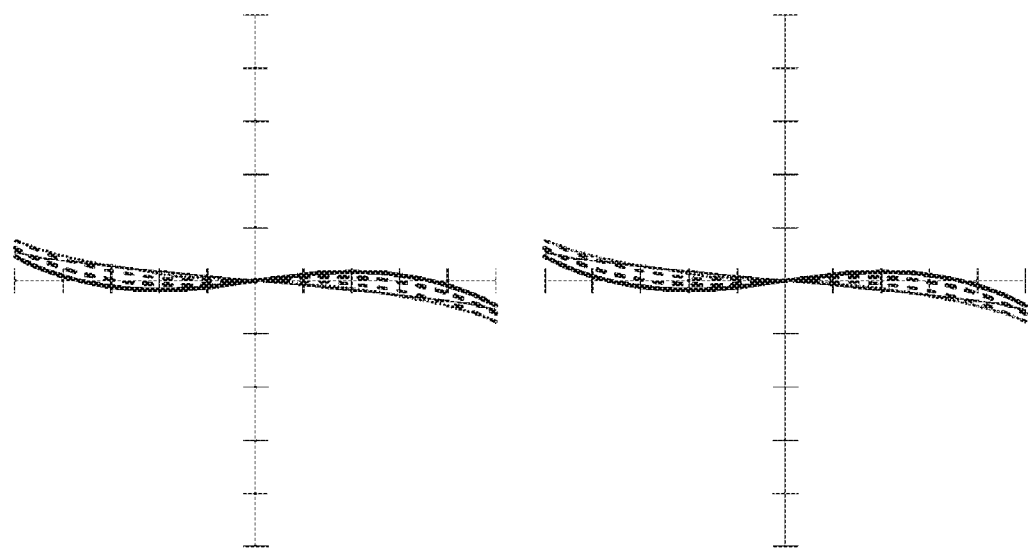
Figure 4F:
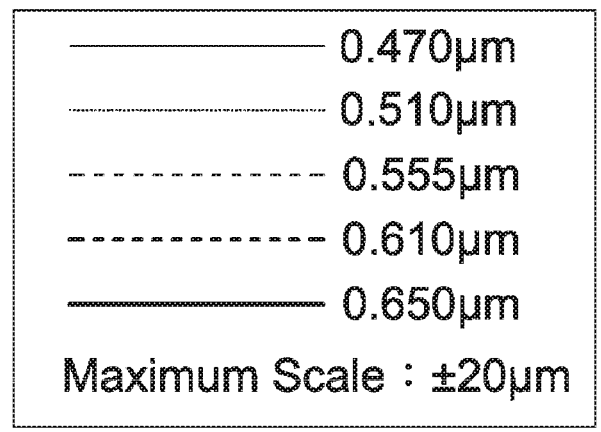
Figure 4F:
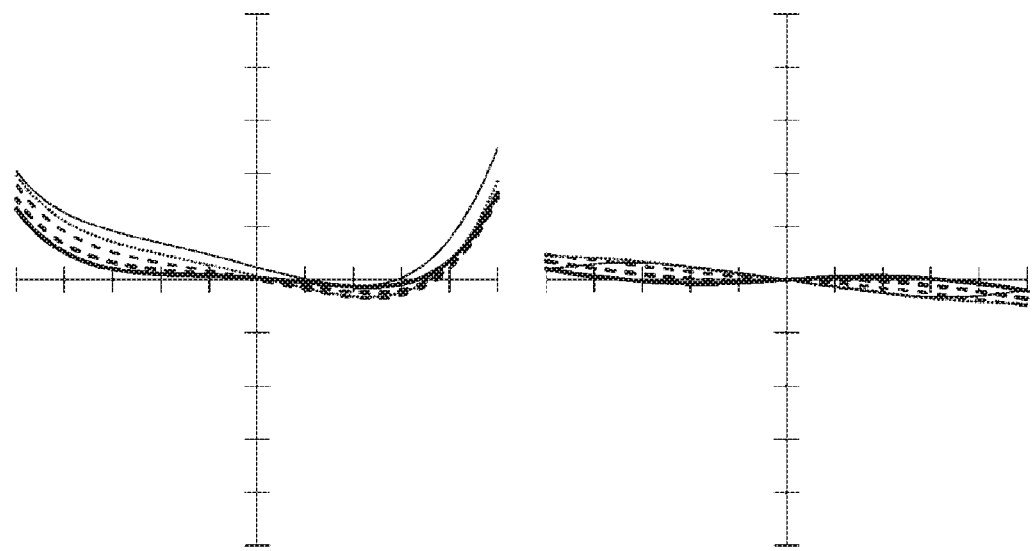
Figure 4G:
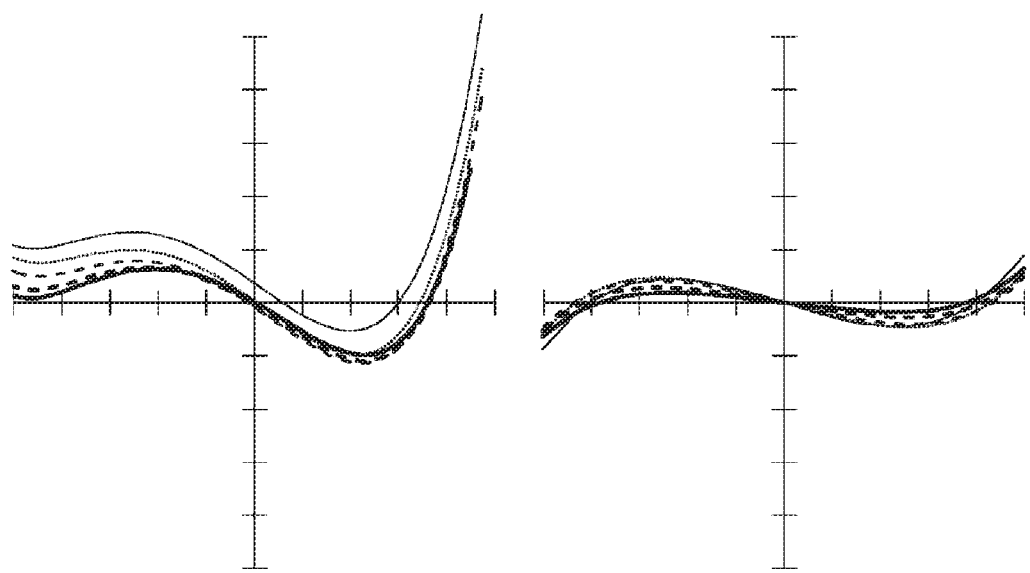
Figure 4H:
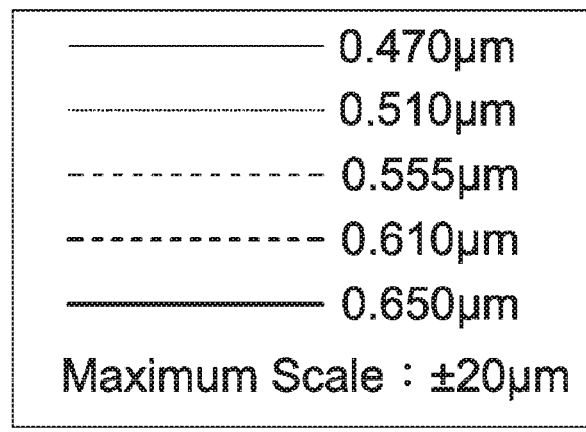
Figure 4H:
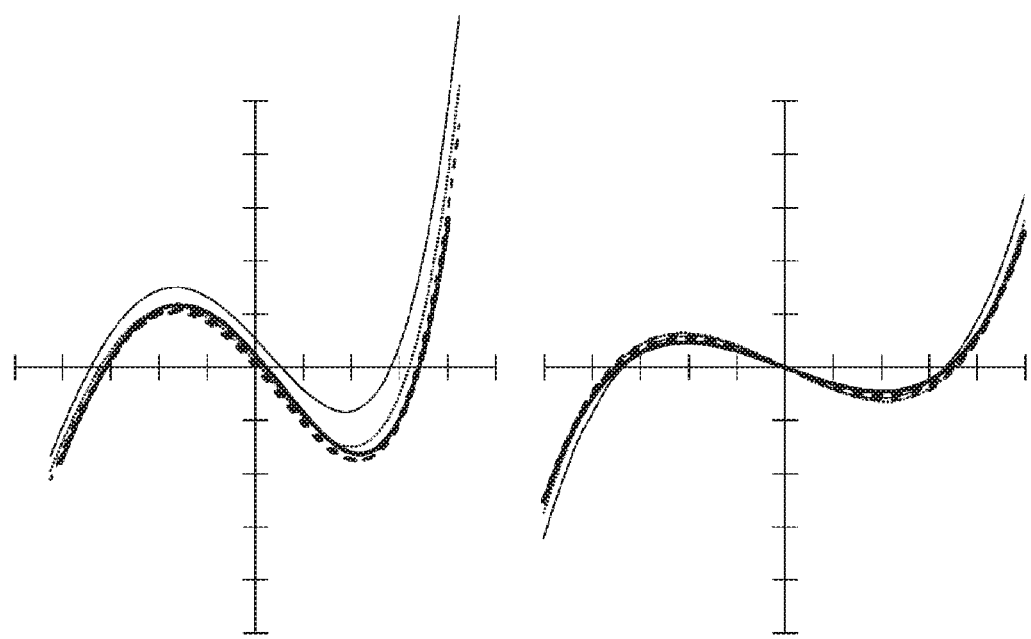
Figure 4I:
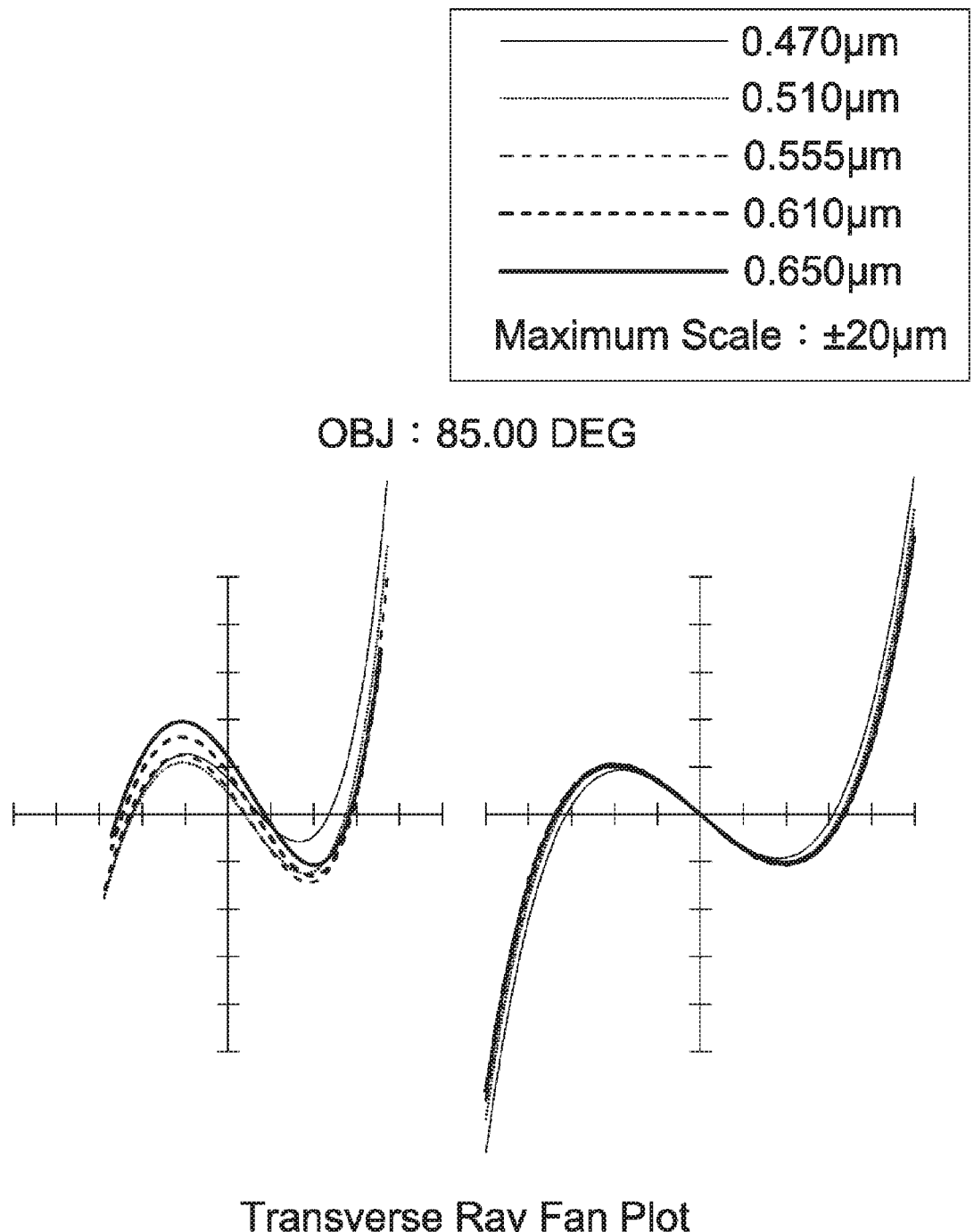
Figure 4J:
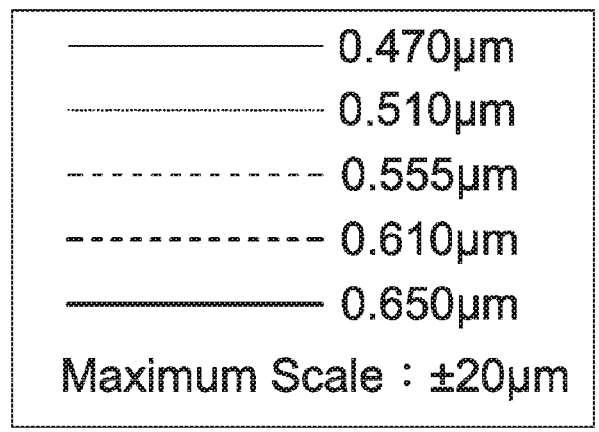
Figure 4J:
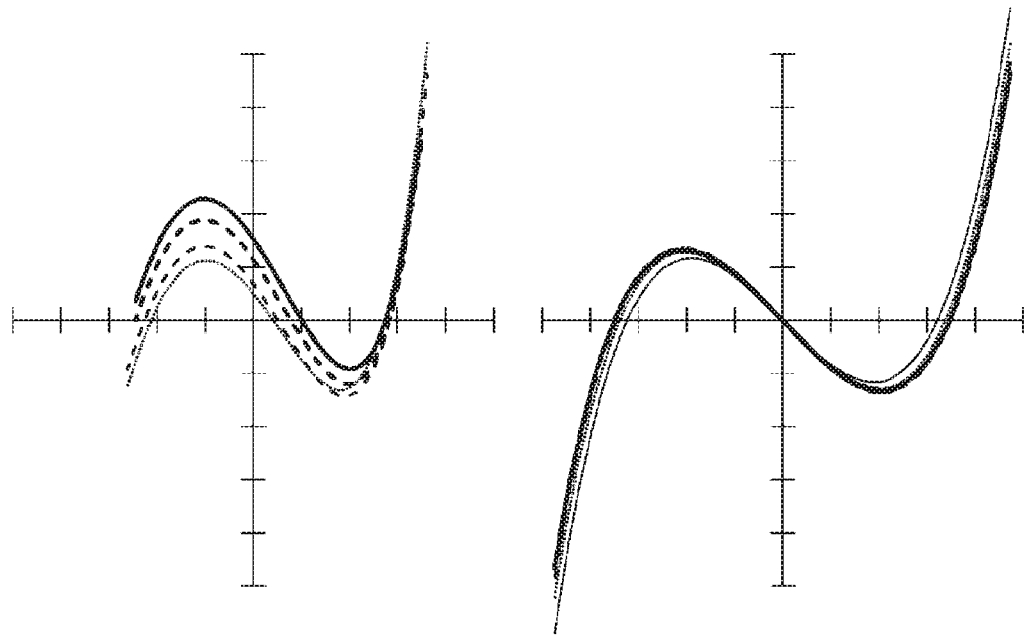

The wide-angle lens assembly 2 of the second embodiment can meet the requirements of optical performance as seen in FIGS. 4A-4J, wherein FIG. 4A shows the longitudinal aberration diagram of the wide-angle lens assembly 2 of the second embodiment. FIG. 4B shows the field curvature diagram of the wide-angle lens assembly 2 of the second embodiment, FIG. 4C shows the distortion diagram of the wide-angle lens assembly 2 of the second embodiment, FIG. 4D shows the lateral color diagram of the wide-angle lens assembly 2 of the second embodiment, and FIGS. 4E-4J show the transverse ray fan diagrams of the wide-angle lens assembly 2 of the second embodiment.

It can be seen from FIG. 4A that the longitudinal aberration in the wide-angle lens assembly 2 of the second embodiment ranges from −0.015 mm to 0.01 mm.

It can be seen from FIG. 4B that the field curvature of the wide-angle lens assembly 2 of the second embodiment ranges from −0.09 mm to 0.01 mm.

It can be seen from FIG. 4C that the distortion of the wide-angle lens assembly 2 of the second embodiment ranges from −100% to 0%.

It can be seen from FIG. 4D that the lateral color of the wide-angle lens assembly 2 of the second embodiment ranges from −0.5 μm to 3.5 μm.

It can be seen from FIGS. 4E-4J that the transverse ray fan of the wide-angle lens assembly 2 of the second embodiment ranges from −27 μm to 28 μm.

It is obvious that the longitudinal aberration, the field curvature, the distortion, the lateral color and the transverse ray aberration of the wide-angle lens assembly 2 of the second embodiment can be corrected effectively. Therefore, the wide-angle lens assembly 2 of the second embodiment is capable of good optical performance.

What is claimed is:

1. A wide-angle lens assembly comprising:
a first lens group with negative refractive power;
a second lens group with negative refractive power;
a third lens group with positive refractive power;
a fourth lens group with positive refractive power; and
a fifth lens group with positive refractive power;
wherein the first lens group comprises a first lens, the second lens group comprises a second lens, the third lens group comprises a third lens;
wherein the first lens group, the second lens group, the third lens group, the fourth lens group and the fifth lens group are arranged in order from an object side to an image side along an optical axis;
wherein the fourth lens group comprises a sixth lens;
wherein the sixth lens comprises a concave surface facing the object side and another concave surface facing the image side;
wherein the wide-angle lens assembly satisfies:

$0.5 < |f_{LG_4}/f_{LG_5}| < 1.8$, where $f_{LG_4}$ is an effective focal length of the fourth lens group, and $f_{LG_5}$ is an effective focal length of the fifth lens group;
wherein the wide-angle lens assembly satisfies at least one of following conditions:

$TTL/f < 11$;

$19 < TTL/T_1 < 24$;

$-3.4 < f_{LG_1}/f < f_{LG_2}/f < f_{LG_3}/f < 3.8$;

where TTL is a distance between an object side surface of the first lens and an image plane along the optical axis, f is an effective focal length of the wide-angle lens assembly, $T_1$ is a thickness of the first lens along the optical axis, $f_{LG_1}$ is an effective focal length of the first lens group, $f_{LG_2}$ is an effective focal length of the second lens group, and $f_{LG_3}$ is an effective focal length of the third lens group.

2. The wide-angle lens assembly as claimed in claim 1, wherein the fourth lens group comprises a fourth lens and a sixth lens, the fifth lens group comprises a fifth lens, the first lens is with negative refractive power, the second lens is with negative refractive power, the third lens is with positive refractive power, the fourth lens is with positive refractive power, and the fifth lens is with positive refractive power.

3. The wide-angle lens assembly as claimed in claim 2, wherein:
the sixth lens is with negative refractive power.

4. The wide-angle lens assembly as claimed in claim 3, wherein:
the second lens comprises a flat surface facing the object side and a concave surface facing the image side;
the sixth lens comprises a concave surface facing the object side and another concave surface facing the image side.

5. The wide-angle lens assembly as claimed in claim 2, wherein:
the first lens comprises a convex surface facing the object side and a concave surface facing the image side;
the third lens comprises a convex surface facing the object side and another convex surface facing the image side;
the fourth lens comprises a convex surface facing the object side and another convex surface facing the image side;
the fifth lens comprises a convex surface facing the object side and another convex surface facing the image side.

6. The wide-angle lens assembly as claimed in claim 5, wherein:
the second lens comprises a flat surface facing the object side and a concave surface facing the image side;
the sixth lens comprises a concave surface facing the object side and another concave surface facing the image side.

7. The wide-angle lens assembly as claimed in claim 1, wherein the sixth lens is with negative refractive power.

8. The wide-angle lens assembly as claimed in claim 1, wherein the wide-angle lens assembly satisfies at least one of following conditions:

$1 < |f_{LG_1}/f_{LG_2}| < 1.8$;

$7.5 < TTL/T_3 < 9.6$;

$2.5 < |f_{LG_3}/f| < 3.8$;

$10.6 < TTL/T_6 < 29$;

$BFL/TTL > 0.22$;

$0.5 < |Vd_1/Vd_2| < 1.1$; and $21.6 < |Vd_2/Nd_2| < 47.3$;

wherein TTL is the distance between the object side surface of the first lens and the image plane along the optical axis, f is the effective focal length of the wide-angle lens assembly, $f_{LG_1}$ is the effective focal length of the first lens group, $f_{LG_2}$ is the effective focal length of the second lens group, $f_{LG_3}$ is the effective focal length of the third lens group, $T_3$ is a thickness of the third lens along the optical axis, $T_6$ is a thickness of a lens closest to the image side along the optical axis, BFL is a distance between an image side surface of the fifth lens and the imaging surface along the optical axis, $Vd_1$ is an Abbe number of the first lens, $Vd_2$ is an Abbe number of the second lens, and $Nd_2$ is a refractive index of the second lens.

9. A wide-angle lens assembly comprising:
a first lens group with negative refractive power;
a second lens group with negative refractive power;
a third lens group with positive refractive power;
a fourth lens group with positive refractive power; and
a fifth lens group with positive refractive power;

wherein the first lens group comprises a first lens having negative refractive power, the second lens group comprises a second lens having negative refractive power, the third lens group comprises a third lens having positive refractive power, the fourth lens group comprises a fourth lens having positive refractive power and a sixth lens having negative refractive power, and the fifth lens group comprises a fifth lens having positive refractive power;

wherein the first lens group, the second lens group, the third lens group, the fourth lens group and the fifth lens group are arranged in order from an object side to an image side along an optical axis;

wherein the second lens comprises a flat surface facing the object side and a concave surface facing the image side;

wherein the sixth lens comprises a concave surface facing the image side and another concave surface facing the object side;

wherein the wide-angle lens assembly satisfies:

$0.5<|f_{LG_4}/f_{LG_5}|<1.8$;

where $f_{LG_4}$ is an effective focal length of the fourth lens group, and $f_{LG_5}$ is an effective focal length of the fifth lens group;

wherein the fifth lens group comprises a fifth lens, and the wide-angle lens assembly satisfies at least one of following conditions:

$TTL/f<11$;

$19<TTL/T_1<24$; and $-3.4<f_{LG_1}/f<f_{LG_2}/f<f_{LG_3}/f<3.8$;

$1<|f_{LG_1}/f_{LG_2}|<1.8$;

$7.5<TTL/T_3<9.6$;

$2.5<|f_{LG_3}/f|<3.8$;

$BFL/TTL>0.22$;

$0.5<|Vd_1/Vd_2|<1.1$; and $21.6<|Vd_2/Nd_2|<47.3$;

wherein TTL is a distance between an object side surface of the first lens and an image plane along the optical axis, f is an effective focal length of the wide-angle lens assembly, $T_1$ is a thickness of the first lens along the optical axis, $f_{LG_1}$ is an effective focal length of the first lens group, $f_{LG_2}$ is an effective focal length of the second lens group, and $f_{LG_3}$ is an effective focal length of the third lens group, $T_3$ is a thickness of the third lens along the optical axis, BFL is a distance between an image side surface of the fifth lens and the imaging surface along the optical axis, $Vd_1$ is an Abbe number of the first lens, $Vd_2$ is an Abbe number of the second lens, and $Nd_2$ is a refractive index of the second lens.

10. The wide-angle lens assembly as claimed in claim 9, wherein:
the fourth lens group comprises a sixth lens;
the sixth lens is with negative refractive power; and
the sixth lens comprises a concave surface facing the object side and another concave surface facing the image side.

11. The wide-angle lens assembly as claimed in claim 9, wherein:

the first lens comprises a convex surface facing the object side and a concave surface facing the image side;
the third lens comprises a convex surface facing the object side and another convex surface facing the image side;
the fourth lens comprises a convex surface facing the object side and another convex surface facing the image side; and
the fifth lens comprises a convex surface facing the object side and another convex surface facing the image side.

12. The wide-angle lens assembly as claimed in claim 9, wherein:
the second lens comprises a flat surface facing the object side and a concave surface facing the image side; and
the sixth lens comprises a concave surface facing the object side and another concave surface facing the image side.

13. A wide-angle lens assembly comprising:
a first lens group with negative refractive power;
a second lens group with negative refractive power;
a third lens group with positive refractive power;
a fourth lens group with positive refractive power; and
a fifth lens group with positive refractive power;
wherein the first lens group comprises a first lens, the second lens group comprises a second lens, the third lens group comprises a third lens;
wherein the first lens group, the second lens group, the third lens group, the fourth lens group and the fifth lens group are arranged in order from an object side to an image side along an optical axis;
wherein the second lens comprises a convex surface facing the object side and a concave surface facing the image side;
wherein the fifth lens group comprises a sixth lens;
wherein the sixth lens comprises a concave surface facing the object side and a convex surface facing the image side;
wherein the wide-angle lens assembly satisfies:

$0.5<|f_{LG_4}/f_{LG_5}|<1.8$;

where $f_{LG_4}$ is an effective focal length of the fourth lens group, and $f_{LG_5}$ is an effective focal length of the fifth lens group;

wherein the fifth lens group comprises a fifth lens, and the wide-angle lens assembly satisfies at least one of following conditions:

$TTL/f<11$;

$19<TTL/T_1<24$; and $-3.4<f_{LG_1}/f<f_{LG_2}/f<f_{LG_3}/f<3.8$;

$1<|f_{LG_1}/f_{LG_2}|<1.8$;

$7.5<TTL/T_3<9.6$;

$2.5<|f_{LG_3}/f|<3.8$;

$BFL/TTL>0.22$;

$0.5<|Vd_1/Vd_2|<1.1$; and $21.6<|Vd_2/Nd_2|<47.3$;

wherein TTL is a distance between an object side surface of the first lens and an image plane along the optical axis, f is an effective focal length of the wide-angle lens assembly, $T_1$ is a thickness of the first lens along the optical axis, $f_{LG_1}$ is an effective focal length of the first lens group, $f_{LG_2}$ is an effective focal length of the second lens group, and $f_{LG_3}$ is an effective focal length of the third lens group, $T_3$ is a thickness of the third lens along the optical axis, BFL is a distance between an image side surface of the fifth lens and the imaging surface along the optical axis, $Vd_1$ is an Abbe number of the first lens, $Vd_2$ is an Abbe number of the second lens, and $Nd_2$ is a refractive index of the second lens.

14. The wide-angle lens assembly as claimed in claim 13, wherein the fourth lens group comprises a fourth lens when the fifth lens group comprises the sixth lens, the first lens is with negative refractive power, the second lens is with negative refractive power, the third lens is with positive refractive power, the fourth lens is with positive refractive power, and a fifth lens is with positive refractive power.

15. The wide-angle lens assembly as claimed in claim 13, wherein:
   the first lens comprises a convex surface facing the object side and a concave surface facing the image side;
   the third lens comprises a convex surface facing the object side and another convex surface facing the image side;
   the fourth lens group comprises a fourth lens and the fourth lens comprises a convex surface facing the object side and another convex surface facing the image side; and
   the fifth lens comprises a convex surface facing the object side and another convex surface facing the image side.

16. The wide-angle lens assembly as claimed in claim 13, wherein:
   the sixth lens is with negative refractive power; and
   the sixth lens comprises a concave surface facing the object side and a convex surface facing the image side.

* * * * *